(12) United States Patent
Anhalt et al.

(10) Patent No.: US 11,518,222 B2
(45) Date of Patent: Dec. 6, 2022

(54) VEHICLE FLAP

(71) Applicant: Bayerische Motoren Werke Aktiengesellschaft, Munich (DE)

(72) Inventors: Holger Anhalt, Groebenzell (DE); Simon Randler, Miesbach (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 17/057,254

(22) PCT Filed: Apr. 30, 2019

(86) PCT No.: PCT/EP2019/061037
§ 371 (c)(1),
(2) Date: Nov. 20, 2020

(87) PCT Pub. No.: WO2019/228736
PCT Pub. Date: Dec. 5, 2019

(65) Prior Publication Data
US 2021/0197651 A1    Jul. 1, 2021

(30) Foreign Application Priority Data
May 30, 2018   (DE) ................. 10 2018 208 566.8

(51) Int. Cl.
*B60J 5/10*   (2006.01)
*B60J 10/86*  (2016.01)
*B60J 1/18*   (2006.01)

(52) U.S. Cl.
CPC .............. *B60J 5/107* (2013.01); *B60J 1/1838* (2013.01); *B60J 5/101* (2013.01); *B60J 5/105* (2013.01); *B60J 10/86* (2016.02)

(58) Field of Classification Search
CPC ..... B60J 5/10; B60J 5/101; B60J 5/107; B60J 5/108
(Continued)

(56) References Cited

U.S. PATENT DOCUMENTS 3,680,910 A * 8/1972 Stanner ................. B62D 25/12
                                                        296/76
4,880,267 A   11/1989 Ohya
(Continued)

FOREIGN PATENT DOCUMENTS

DE   10 2004 045 649 A1   4/2006
DE   10 2010 054 915 A1   6/2012
(Continued)

OTHER PUBLICATIONS

International Search Report (PCT/ISA/210) issued in PCT Application No. PCT/EP2019/061037 dated Apr. 30, 2019 with English translation (four (4) pages).
(Continued)

*Primary Examiner* — Jason S Morrow
*Assistant Examiner* — Wenwei Zhuo
(74) *Attorney, Agent, or Firm* — Crowell & Moring LLP

(57) ABSTRACT

A vehicle flap, such as a tailgate, has an inner shell, such as an inner metal sheet, an outer shell, such as an outer metal sheet, connected to the inner shell, and at least one reinforcement tube. The reinforcement tube is arranged between the inner shell and outer shell and is connected to the inner shell and/or outer shell.

16 Claims, 5 Drawing Sheets

(58) Field of Classification Search
USPC .................................. 296/56, 146.5, 146.8
See application file for complete search history.

(56) References Cited

U.S. PATENT DOCUMENTS

| | | | | |
|---|---|---|---|---|
| 5,449,213 | A * | 9/1995 | Kiley | B60J 5/101 296/146.5 |
| 9,834,072 | B1 * | 12/2017 | Alvarez Ruiz | B60J 5/101 |
| 2003/0122399 | A1 * | 7/2003 | Seksaria | B60J 5/107 296/146.8 |
| 2005/0046229 | A1 * | 3/2005 | Yamada | E05D 7/04 296/146.8 |
| 2011/0061302 | A1 * | 3/2011 | Barral | B60J 5/107 49/70 |
| 2014/0203591 | A1 * | 7/2014 | Lathwesen | B60J 5/107 296/146.8 |
| 2016/0152121 | A1 * | 6/2016 | Ikeda | B60J 5/107 49/501 |
| 2017/0066306 | A1 | 3/2017 | Ueno et al. | |
| 2021/0283999 | A1 * | 9/2021 | Harney | B60J 5/0441 |

FOREIGN PATENT DOCUMENTS

| | | | | |
|---|---|---|---|---|
| DE | 102018132275 | A1 * | 6/2019 | B60J 5/101 |
| FR | 2804070 | A1 * | 7/2001 | B60J 5/101 |
| JP | 61021840 | A * | 1/1986 | B60J 5/101 |

OTHER PUBLICATIONS

German-language Written Opinion (PCT/ISA/237) issued in PCT Application No. PCT/EP2019/061037 dated Apr. 30, 2019 (five (5) pages).
German-language Search Report issued in German Application No. 10 2018 208 566.8 dated Mar. 21, 2019 with partial English translation (12 pages).

* cited by examiner

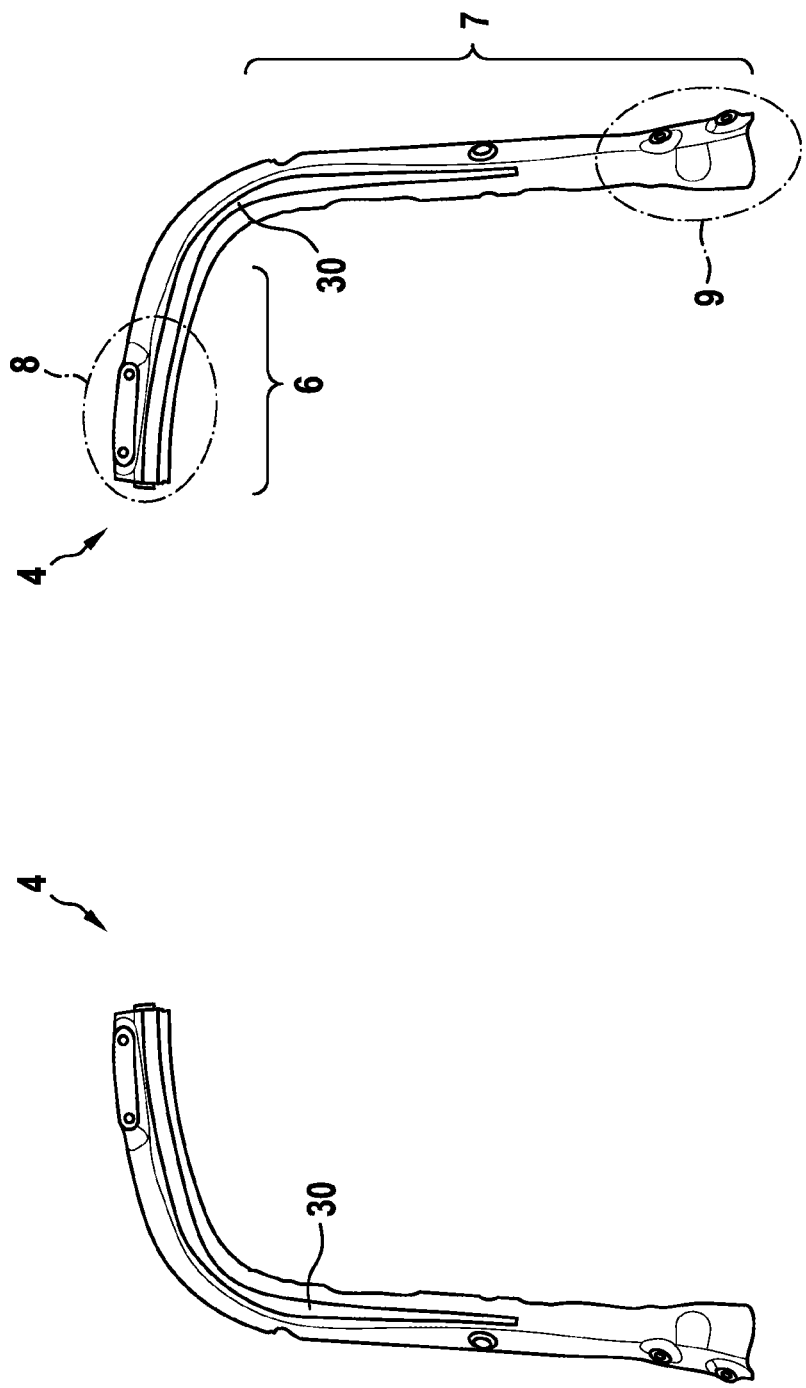

VEHICLE FLAP

BACKGROUND AND SUMMARY OF THE INVENTION

The invention relates to a vehicle flap for a vehicle. In particular, the vehicle flap takes the form of a tailgate.

The prior art discloses different vehicle flaps on vehicles. When formed as tailgates, they close a loading space or luggage compartment of a vehicle. Previously known vehicle flaps are made up for example of an inner metal sheet and an outer metal sheet and any further metal sheets. Hinges are usually used to connect the vehicle flaps to the body of the vehicle. Where appropriate, an opening mechanism is provided in order to open the flap without a force being exerted by the user or to assist the manual opening.

It is an object of the present invention to provide a vehicle flap for a vehicle that is lightweight while being simple to produce and allowing for safe operation of the vehicle.

The object is achieved by a vehicle flap. The vehicle flap is particularly designed for use on a vehicle. In particular, what is concerned here is a road vehicle, particularly preferably a two-track passenger car. In particular, the vehicle flap is situated at the rear of the vehicle and is thus also referred to as a tailgate. The vehicle flap is connected to a body of the vehicle particularly by means of hinges.

According to the invention, the vehicle flap comprises an inner shell and an outer shell. The inner shell is connected to the outer shell directly and/or indirectly, for example by adhesive bonding and/or welding. In principle, the inner shell and the outer shell can be produced from any desired material. Use is typically made here of a metal sheet, and therefore the inner shell can also be referred to as an inner metal sheet and the outer shell can also be referred to as an outer metal sheet.

What is preferably characteristic for the inner shell and outer shell is that they both extend around a window opening of the vehicle flap. The inner shell and outer shell are thus preferably not metal sheets in the vehicle flap that are used only for stabilizing certain regions; rather, the inner shell and the outer shell together form the substantial geometry of the vehicle flap. With the vehicle flap closed, the inner shell faces inward and the outer shell faces outward. Particularly within the inner shell there can also be arranged a cladding.

According to the invention, at least one reinforcing tube is situated between the inner shell and outer shell. With particular preference, exactly two of the reinforcing tubes described here are used. The at least one reinforcing tube is connected to the inner shell and/or the outer shell. This connection occurs in a form-fitting manner, a force-fitting manner and/or integrally bonded manner. In particular, the reinforcing tube is welded and/or adhesively bonded to the inner shell and the outer shell.

The use of the reinforcing tube increases the stiffness of the vehicle flap. By virtue of the arrangement between inner shell and outer shell according to the invention, the inner shell forms a continuous, uninterrupted surface which is used in particular for a sealing surface. Furthermore, the reinforcing tube can thus be directly connected to the outer shell and the inner shell.

With particular preference, there is provision that the reinforcing tube has a transverse portion. The transverse portion extends above the window opening. On this transverse portion there is arranged a hinge for attaching the vehicle flap to a body. Where appropriate, a reinforcing plate can here be fitted into or onto the reinforcing tube for screwing to the hinge.

The transverse portion preferably extends +/−25° parallel to the vehicle transverse axis.

The hinge is preferably screwed to the reinforcing tube, in particular to the transverse portion. The screw connection, and hence the longitudinal axis of the screws, runs preferably +/−25°, in particular +/−15°, perpendicular to the vehicle transverse axis. The screw connection thus extends substantially in the vehicle longitudinal direction and/or the vehicle vertical direction. This screw connection is possible in particular since the reinforcing tube has a transverse portion and hence the hinge can be screwed directly to the reinforcing tube and not for instance to the inner or outer metal sheet.

Furthermore, there is preferably provision that the reinforcing tube has a side portion. In particular, the transverse portion transitions directly into the side portion. In particular, the reinforcing tube is designed in one piece.

The side portion extends laterally to the window opening. With particular preference, there is provision that an opening mechanism is fastened to the side portion. This opening mechanism, for example an electric spindle drive or a hydraulic or pneumatic cylinder, is designed to open and/or close or to assist the manual actuation of the vehicle flap. This fastening of the opening mechanism is preferably situated laterally to or below the window opening of the vehicle flap.

Furthermore, there is preferably provision that the vehicle flap has a sealing surface. The sealing surface points inward with respect to the vehicle. In particular, the sealing surface is formed by the inner shell. The sealing surface is in particular designed to be fully circumferential and closed. In particular, the sealing surface is formed exclusively and without interruption by the inner shell.

The sealing surface runs at least in certain portions in the region of the at least one reinforcing tube. This means that with a view perpendicular to the sealing surface, the sealing surface overlaps with the reinforcing tube. The arrangement of the reinforcing tube inside the flap, that is to say between the inner shell and outer shell, means that it is possible to position the sealing surface at the same position as the reinforcing tube without thereby the sealing surface being formed by the reinforcing tube itself or being interrupted. Since the reinforcing tube is arranged between the inner shell and outer shell, the sealing surface can be formed exclusively by the inner shell.

The sealing surface is designed to bear against a complementary body sealing surface or a seal which is arranged on the body side.

Furthermore, there is preferably provision that the inner shell has a U-shaped cross-sectional region, wherein the reinforcing tube is arranged at least partially inside this U-shaped cross-sectional region. The sealing surface is likewise formed by the U-shaped cross-sectional region and is situated on the outer side of the U-shaped cross-sectional region.

As already mentioned, there is preferably provision that the respective reinforcing tube is produced in one piece. Additionally or alternatively, the reinforcing tube preferably has, at least on certain portions, a fully circumferentially closed cross section.

Furthermore, there is preferably provision that the reinforcing tube is a hydroformed tube. Hydroforming particularly makes possible a one-piece bent tube that has the aforementioned transverse portion and side portion.

In principle, there are body constructions with a water gutter and without a water gutter. A water gutter refers to a region of the body around the rear opening; at least laterally to the opening and possibly above it and/or below it. The water gutter is usually covered by an overhang of the vehicle flap, but is situated radially outside the seal such that water can run into this water gutter. If the construction provides a water gutter, the opening mechanism can also be arranged in this water gutter.

The here presented construction of the vehicle flap makes it possible to use the reinforcing tube and at the same time to arrange the sealing surface as far as possible to the inside (close to the window opening). Radially outside the sealing surface there thus remains sufficient installation space for configuring an overhang which in turn can cover the body-side water gutter.

Thus, there is preferably provision that the inner shell and outer shell project laterally beyond the sealing surface with an overhang. The overhang length, measured from the radially outer end of the sealing surface, is preferably at least 3 cm, particularly preferably at least 7 cm, in particular at least 10 cm.

The invention further comprises a vehicle having a body and a vehicle flap as has just been described.

There is preferably provision that the body comprises, at least in the region laterally to the vehicle flap or the rear opening, a water gutter which can be concealed by the vehicle flap. The water gutter is situated outside the seal formed by the tailgate and body. On at least one side there is preferably situated in the water gutter an opening mechanism for opening the vehicle flap. As already described, this opening mechanism is preferably fastened to the side portion of the reinforcing tube. The attachment/fastening can also occur at the top at the transition from the transverse portion to the side portion. Here too, a reinforcement of the reinforcing tube to secure the tailgate stiffness is possible.

Furthermore, there is preferably provision that when using two reinforcing tubes on both sides of the window opening, two symmetrical components and/or identical parts are used as reinforcing tubes which, for example in the case of hydroforming, can be produced in the same mold.

Further details, features and advantages of the invention will emerge from the following description and the figures.

BRIEF DESCRIPTION OF THE DRAWINGS

FIG. 5 shows two reinforcing tubes of the vehicle flap according to the invention according to the exemplary embodiment in isolation.

DETAILED DESCRIPTION OF THE DRAWINGS

A vehicle flap 1, designed as a tailgate of a passenger car, will be explained more precisely below on the basis of FIGS. 1 to 5.

Figure 1:
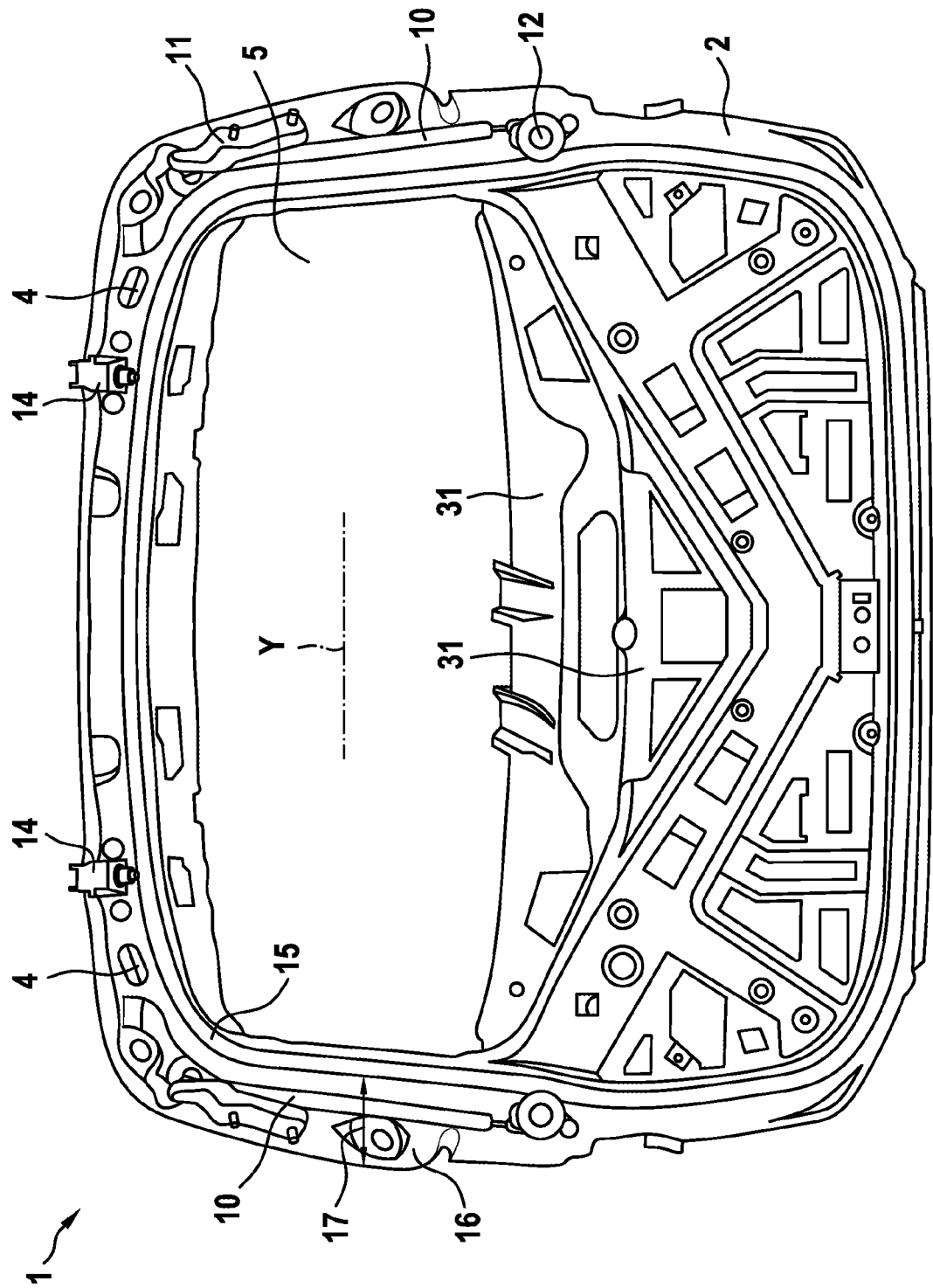
FIG. 1 shows a vehicle flap according to the invention according to one exemplary embodiment.
Figure 2:
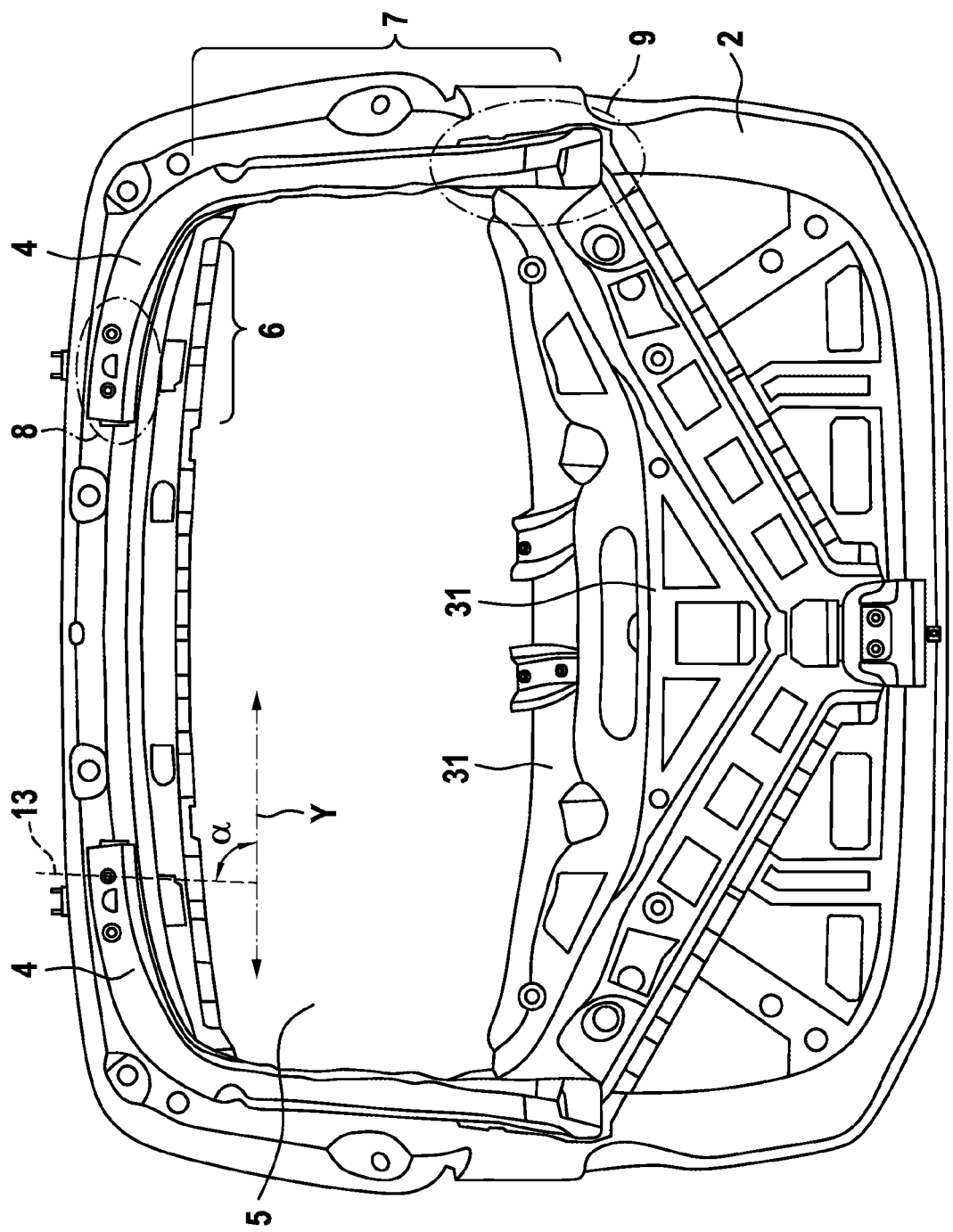
FIG. 2 shows a further view of the vehicle flap according to the invention according to the exemplary embodiment.
Figure 4:
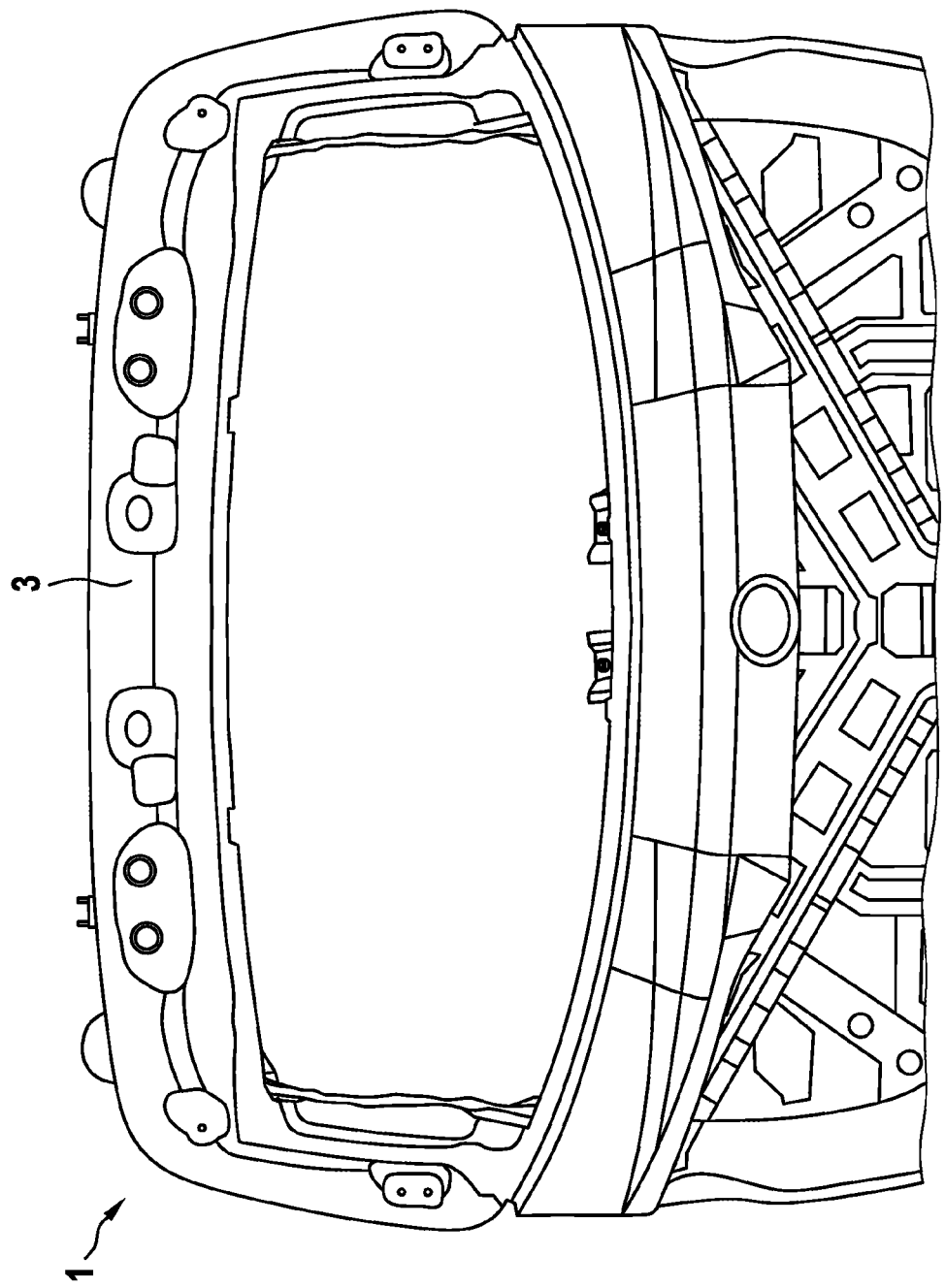
FIG. 4 shows a view of the vehicle flap according to the invention according to the exemplary embodiment from behind.

The vehicle flap 1 comprises an inner shell 2 and an outer shell 3. FIG. 1 shows the vehicle flap 1 as viewed from the vehicle interior, without any cladding. FIG. 2 shows the vehicle flap 1 from outside or from behind, with the outer shell 3 being blanked out. An illustration from behind including the outer shell 3 is shown in FIG. 4.

Reference is made below to FIGS. 1 to 5.

In addition to the inner shell and the outer shell, the vehicle flap 1 comprises two reinforcing tubes 4. The two reinforcing tubes 4 are arranged between the inner shell 2 and outer shell 3.

The inner shell 2 and the outer shell 3 together form the geometry of the vehicle flap 1 and extend in a fully circumferential and closed manner around a window opening 5.

To reinforce the construction, optional further metal sheets 31 can be used and can be connected to the inner shell 2, outer shell 3 and/or the reinforcing tubes 4.

As shown in particular in FIG. 2, each individual reinforcing tube 4 comprises a transverse portion 6 and a side portion 7. The reinforcing tube 4 is produced in one piece as a hydroformed tube.

The transverse portion 6 extends substantially parallel to the vehicle transverse axis Y. The side portion 7 extends substantially perpendicularly to the vehicle transverse axis Y.

A hinge region 8 is formed on the transverse portion 6. At this hinge region 8, the reinforcing tube 4 is connected to hinges 14 via screw connections having a screwing direction 13. The screwing direction 13 extends substantially perpendicularly to the vehicle transverse axis Y.

At the lower end of the side portion 7 there is situated an attachment region 9 for attaching an opening mechanism 10. The opening mechanism 10 is connected directly, in particular screwed, to the reinforcing tube 4 by a flap-side stop 12. The other end of the opening mechanism 10 is connected to a body 20 via a body-side stop 11.

Furthermore, FIG. 1 shows a completely encircling sealing surface 15 of the vehicle flap 1, which is formed by the inner shell 2.

Figure 3:
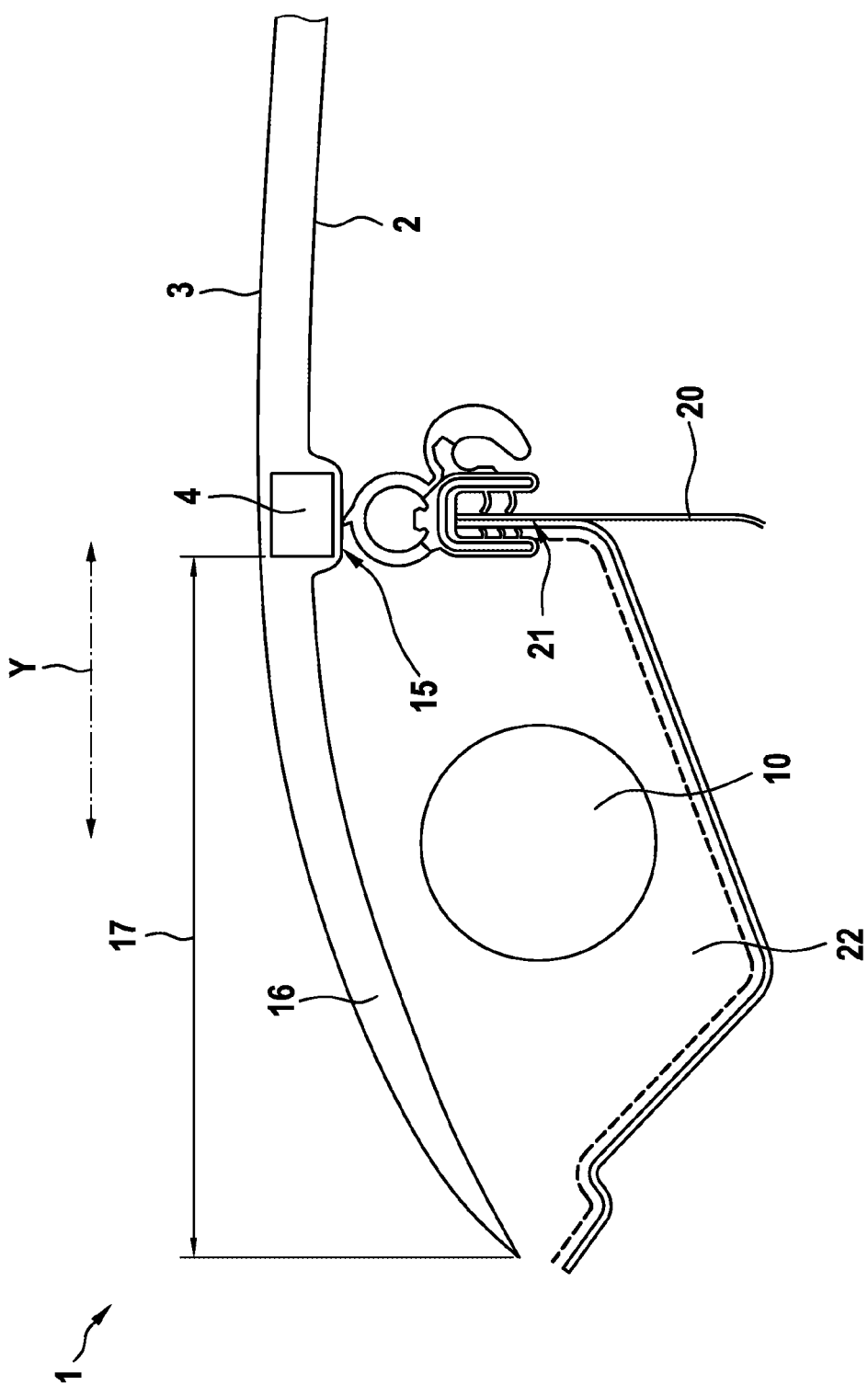
FIG. 3 shows a schematic sectional view of the vehicle flap according to the invention according to the exemplary embodiment.

The schematic cross-sectional view in FIG. 3 shows not only the vehicle flap 1 but also schematically a part of the body 20. What is concerned here is a body design with a water gutter 22. The opening mechanism 10 is arranged in this water gutter 22.

The vehicle flap 1, in particular the inner shell 2 and outer shell 3, extend beyond the sealing surface 15 with an overhang 16 which has an overhang length 17.

In the closed state of the vehicle flap 1, the overhang 16 covers the water gutter 22.

Furthermore, FIG. 3 shows that the inner shell 2 is of U-shaped design in the region of the reinforcing tube 4. In this U shape there is seated at least part of the cross section of the reinforcing tube 4. Furthermore, this U-shaped region forms the sealing surface 15.

On the body side there is installed a seal 21 against which the sealing surface 15 bears in the closed state of the vehicle flap 1. The water gutter 22 is situated radially outside the body-side seal 21.

FIG. 5 shows in isolation the two reinforcing tubes 4 used. This illustration shows adhesive points 30 for adhesively bonding the reinforcing tube 4 to the shells 2, 3. FIG. 5 illustrates here that the adhesive points 30 can extend both over the transverse portion 6 and over the side portion 7. Additionally or alternatively to the adhesive points 30, it is also possible for example for the reinforcing tubes 4 to be welded to the shells 2, 3.

LIST OF REFERENCE SIGNS

1 Vehicle flap
2 Inner shell

3 Outer shell
4 Reinforcing tube
5 Window opening
6 Transverse portion
7 Side portion
8 Hinge region
9 Attachment region
10 Opening mechanism
11 Body-side stop
12 Flap-side stop
13 Screwing direction
14 Hinge
15 Sealing surface
16 Overhang
17 Overhang length
20 Body
21 Seal
22 Water gutter
30 Adhesive points
31 Further metal sheets

What is claimed is:

1. A vehicle flap, comprising:
an inner shell;
an outer shell connected to the inner shell; and
at least one reinforcing tube which is arranged between the inner shell and the outer shell and is connected to the inner shell and/or outer shell,
wherein the inner shell and the outer shell together define an entire circumference of the vehicle flap and extend in a fully circumferential and closed manner around a window opening of the vehicle flap.

2. The vehicle flap according to claim 1, wherein
the reinforcing tube has a transverse portion which extends over the window opening of the vehicle flap and on which a hinge is arranged for attaching the vehicle flap to a body.

3. The vehicle flap according to claim 2, wherein
a screw connection of the hinge to the reinforcing tube is oriented +/−25° perpendicular to the vehicle transverse axis.

4. The vehicle flap according to claim 1, wherein
the reinforcing tube has a side portion which extends laterally to the window opening of the vehicle flap and to which there is fastened an opening mechanism for opening the vehicle flap.

5. The vehicle flap according to claim 1, further comprising:
a sealing surface formed by the inner shell.

6. The vehicle flap according to claim 5, wherein
the sealing surface runs in certain portions in the region of the at least one reinforcing tube, and
the sealing surface overlaps with the reinforcing tube when viewed perpendicular to the sealing surface.

7. The vehicle flap according to claim 5, wherein
the inner shell has a U-shaped cross-sectional region,
the reinforcing tube is arranged in the U-shaped cross-sectional region, and
the sealing surface is formed by an outer side of the U-shaped cross-sectional region.

8. The vehicle flap according to claim 1, wherein
an individual reinforcing tube is in one piece, has a fully circumferentially closed cross section, and/or is a hydroformed tube.

9. The vehicle flap according to claim 5, wherein
the inner shell and outer shell extend with an overhang laterally beyond the sealing surface by at least 3 cm to cover a body-side water gutter.

10. The vehicle flap according to claim 5, wherein
the inner shell and outer shell extend with an overhang laterally beyond the sealing surface by at least 7 cm to cover a body-side water gutter.

11. The vehicle flap according to claim 5, wherein
the inner shell and outer shell extend with an overhang laterally beyond the sealing surface by at least 10 cm to cover a body-side water gutter.

12. The vehicle flap according to claim 1, wherein
the inner shell is an inner metal sheet, and
the outer shell is an outer metal sheet.

13. A vehicle, comprising:
a body; and
a vehicle flap comprising:
an inner shell;
an outer shell connected to the inner shell; and
at least one reinforcing tube which is arranged between the inner shell and the outer shell and is connected to the inner shell and/or outer shell,
wherein the inner shell and the outer shell together define an entire circumference of the vehicle flap and extend in a fully circumferential and closed manner around a window opening of the vehicle flap,
wherein the body, at least laterally to the vehicle flap, comprises a water gutter concealed by the vehicle flap in a closed state,
wherein the water gutter is arranged outside a seal formed by the vehicle flap and body, and
wherein an opening mechanism for opening the vehicle flap is arranged in the water gutter on at least one side of the vehicle flap.

14. The vehicle flap according to claim 1, wherein
the vehicle flap is a tailgate of a vehicle.

15. The vehicle flap according to claim 1, further comprising:
a sealing surface formed by the inner shell such that the sealing surface extends in a fully circumferential and closed manner around the window opening of the vehicle flap.

16. The vehicle according to claim 13, wherein the vehicle flap further comprises a sealing surface formed by the inner shell such that the sealing surface extends in a fully circumferential and closed manner around the window opening of the vehicle flap.

* * * * *